United States Patent [19]
Wirz et al.

[11] 4,407,262
[45] Oct. 4, 1983

[54] WAFER DICING APPARATUS

[75] Inventors: Gustav Wirz, Berg; Franco Pizzagalli, La Chaux-de-Fonds, both of Switzerland

[73] Assignee: Les Fabriques d'Assortiments Reunies S.A., Le Locle, Switzerland

[21] Appl. No.: 239,681

[22] Filed: Mar. 2, 1981

[30] Foreign Application Priority Data

Mar. 10, 1980 [CH] Switzerland .................. 1853/80

[51] Int. Cl.³ .............................................. B28D 1/04
[52] U.S. Cl. ................................... 125/13 R; 83/404; 51/165.72; 125/35
[58] Field of Search ............... 125/13, 14, 35; 83/404, 83/412–414, 520; 51/165.72

[56] References Cited

U.S. PATENT DOCUMENTS

| | | | |
|---|---|---|---|
| 2,712,306 | 7/1955 | Brescka | 125/13 R |
| 4,016,855 | 4/1977 | Mimata | 125/13 R |
| 4,167,174 | 9/1979 | Hampton | 125/13 R |

FOREIGN PATENT DOCUMENTS

| | | | |
|---|---|---|---|
| 613908 | 7/1978 | U.S.S.R. | 125/13 R |

*Primary Examiner*—Harold D. Whitehead
*Attorney, Agent, or Firm*—Berger & Palmer

[57] ABSTRACT

Installation for the sawing of wafers of semiconductor material encompassing an alignment station (1), a sawing station (9), and a cleaning station (7). A handling device, provided to convey the wafers from one station to another, while ensuring a perfect positioning under the disc (11) of the saw, encompasses at least two supporting platforms (2, 13), of a mobile table (14) and a transfer angle-iron (15). Platforms (2) and (13) are provided to retain a wafer by suction, whether the platforms are carried by fixed support (6) or by mobile table (14).

28 Claims, 5 Drawing Figures

WAFER DICING APPARATUS

SUMMARY OF THE INVENTION

The present invention concerns an installation for the sawing of plate materials, as well as a handling device for such installation. In particular, the invention concerns a sawing installation and a handling device designed for the sawing of semiconductor wafers on which previously a large number of integrated circuits had been produced, in a manner such as to form elementary semiconductor platelets. This process is known as wafer dicing.

The sawing installations of the prior art, such as those marketed for instance under the designations DAD 2 H/5 and DAD 2 H/6 by Disco Abrasive Systems Ltd., Tokyo, Japan, or under the designation 106A by Electroglas Inc., Santa Clara, U.S.A., generally comprise a diamond-bearing disc saw which moves to cut out the semiconductor wafer that had been previously located underneath the disc on a supporting platform. In order to ensure that the cuts of the saw actually coincide with the regions of the wafer that separate the elementary circuits, an aligning operation is effected before each sawing operation, which aligning operation consists of moving the platform in relation to the sawing tool in a manner such that the wafer it carries becomes properly oriented. The alignment is carried out at the sawing station of the installation and is controlled by means of an optical system adjacent to said station.

This kind of installation features a number of disadvantages that are inherent in its structure. In particular, during the entire duration of the aligning operation, the sawing tool is not utilized, which reduces the yield of the installation accordingly. One factor to consider is that, since the moment the alignment must be carried out is determined by the operating cycle of the sawing tool, it is necessary for the operator to be available at the precise moment the sawing of a wafer ends so as to carry out as quickly as possible the alignment of the next wafer. Consequently, the operator cannot efficiently service several sawing installations. Further, the optical alignment system, which is located in the immediate vicinity of the saw, interferes by its presence with any effort to isolate the sawing station from the environment, by means of an appropriate protective hood, such as those used to reduce the operating noise.

Furthermore, in devices according to prior art, the platform supporting the semiconductor wafers must fulfill a great number of functions, which complicate its construction. In particular, it must ensure: (1) that the wafer is maintained in its position; (2) the orientation of the platform in accordance with a vertical axis of rotation and with two orthogonal axes of translation must be maintained; (3) the positioning of the height of the platform must be maintained; (4) the alternating displacement of the platform, in accordance with an axis that is perpendicular to the movement of the axis of the saw during sawing should be maintained; and (5) a precise 90° rotation, after an initial series of parallel saw cuts has been carried out should be effected. This complexity explains why the supporting platforms are not generally displaceable to a station for cleaning the sawed wafers, a fact that makes it necessary to unload the platform before that operation and to independently transport the wafers for cleaning purposes.

This is why one of the objectives of the invention is to provide a sawing installation comprising three individual stations for alignment, for sawing, and for cleaning, and a handling device for displacing the semiconductor wafers to these various stations. The handling device is provided so that the sawing of a wafer may be carried out during the alignment of the next wafer or during the cleaning of the preceding wafer.

Another objective of the invention is to provide a handling device for the semiconductor wafer, which shall utilize at least two independent supporting platforms, each capable of being positioned on first or second types of transfer means. Each supporting platform only ensures the positional maintenance of the wafer it receives, which wafer is deposited in accordance with a perfectly determined orientation at the alignment station. The first type of transfer means ensures the displacement of the wafer towards the sawing station by maintaining that initial orientation on the platform, as well as a precise rotation of the platform by 90°, under the saw, and its positioning in height and conveyance to the cleaning station. The second type of transfer means, which is less precise, returns the platforms from the cleaning station to the alignment station. Thus, the device for positioning the wafers on the platforms may be considerably simpler and easily automated, since it remains integral with the alignment station and independent of the supporting platform. The first type of transfer means, which ensures the precision of orientation of the wafer under the saw, is thus simplified accordingly and causes a perfect axial displacement of the supporting platforms, a rotation by 90° under the saw and an adjustment in height.

The present invention shall be completely understood upon reading the description below, which relates to the attached figures, among which FIG. 1 is a general perspective view of the sawing installation in accordance with the present invention, certain parts of which have been cut out for better representation;

Figure 1:
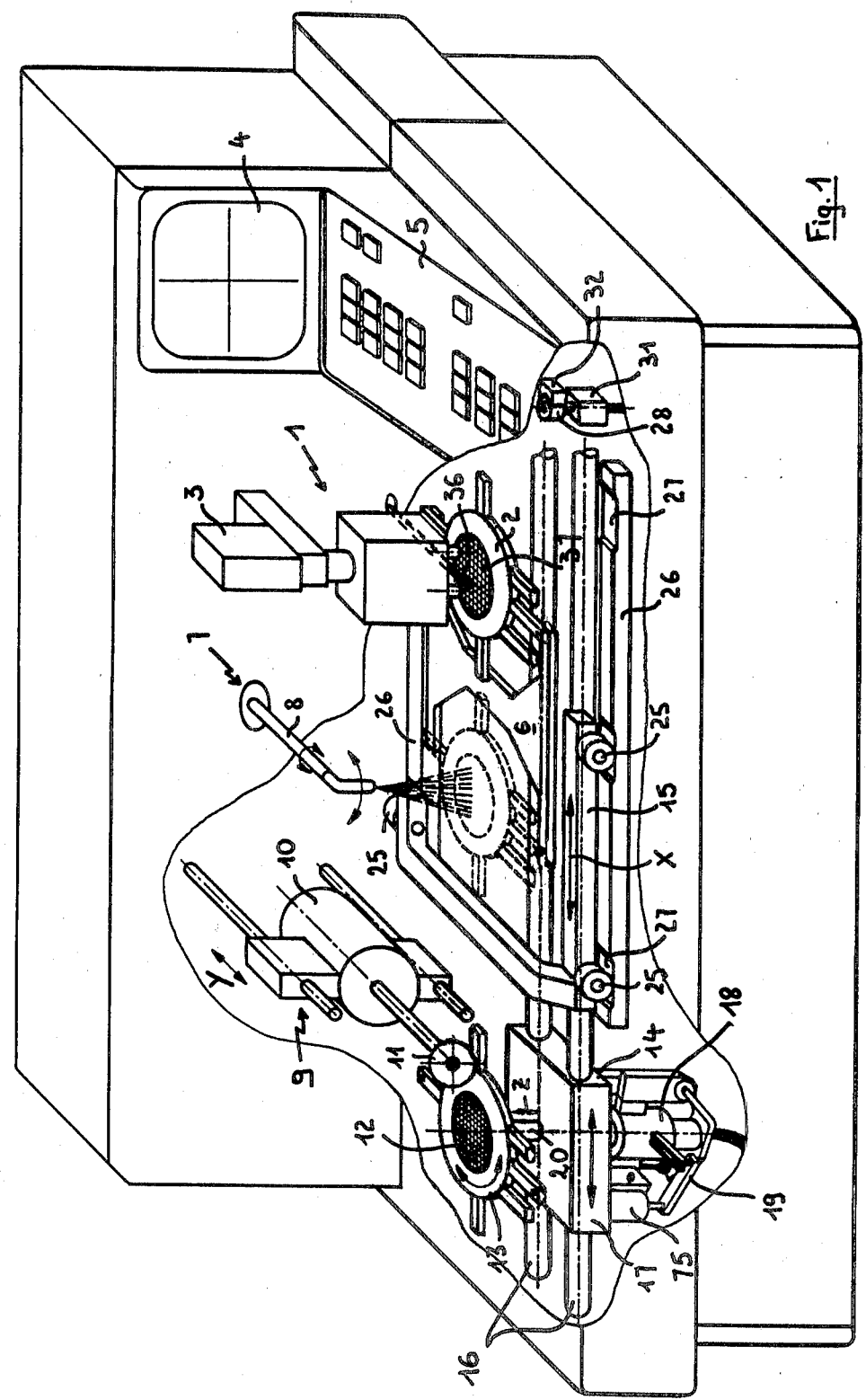

As can be more clearly seen in FIG. 1, the sawing installation comprises three operating stations, generally designated as 1, 7 and 9, aligned along the same axis. At the aligning station 1, a semiconductor wafer 37 is deposited on a supporting platform 2, which platform is borne by a fixed support 6 and is properly oriented by means of a positioning device 36. An optical alignment system 3 makes it possible to form on a screen 4 the image of a zone of the semiconductor wafer, on which image is superimposed a reference image. A control unit 5 makes it possible for an operator to guide the positioning device in a manner such as to effect the coincidence of the two images. At the sawing station 9 there is mounted a diamond-bearing disc saw 11, provided in order to carry out a number of parallel saw cuts on wafer 12, which wafer is carried by a second supporting platform 13, identical to platform 2. The disc saw 11 is driven by a motor 10.

Finally, at the cleaning station 7 located between stations 1 and 9, a jet nozzle 8 with an oscillatory movement carries out the cleaning by means of an appropriate cleaning agent, followed by the drying of the newly sawed wafers, still carried on their platform which is represented by dotted lines on the same fixed support 6.

The sawing installation furthermore comprises a handling device constituted, in addition to the two platforms 2 and 13, of a first type of transfer means 14 and a second type of transfer means 15.

The first type of transfer means 14 forms a mobile table, whose function it is to pick up each platform equipped with a wafer at the aligning station 1; to convey it, while perfectly maintaining its orientation to the sawing station 9; to support it and to properly orient it during the sawing operation; and then to convey it and to deposit at the cleaning station 7. For that purpose, table 14 encompasses a frame 17 which is mounted in sliding fashion on one or more axes 16 which are parallel to the direction of the working stations, represented by the arrow X. A turret schematically shown in 18 is attached on the frame 17, in a manner such as to be able to undergo a precise 90° rotation, in one direction or the other, around a vertical axis, under the actuation of a motor 75 to which the turret is connected through a Maltese Cross mechanism 19. Turret 18 accommodates a central shaft 20, adjustable in height along axis Z, the upper end of which is designed to accommodate platform 2 or 13.

The function of the second type of transfer means 15 is to return in succession each platform 2 or 13 from the cleaning station 7 to the alignment station 1. These transfer means consist of a mobile support in the shape of an angle iron guided by three rollers 25 on rails 26 that are parallel to the direction of arrow X, and the evolving profile of which encompasses the cavities 27.

As can be seen below in conjunction with FIGS. 2 and 4, each supporting platform furthermore encompasses means for retaining a semiconductor wafer by means of suction, which means alternately work in conjunction with fixed support 6 and with mobile table 14 in order that said suction effect may be carried out whether the platform is carried by one or by the other.

The operation of the installation is as follows. First of all, the operator carries out the alignment of a wafer on platform 2 at the aligning station 1. At that moment, the position of platform 2 on the fixed support 6 is not critical, since it shall suffice that mobile table 14 conveys said platform to the sawing station by perfectly maintaining its orientation for the wafer previously oriented under station 1 to find itself in the correct position under disc saw 11. After alignment, mobile table 14 moves to place itself under platform 2, and the precision of its position in the X direction is guaranteed by a retractable stop 28, formed by a rod made of high-hardness material actuated by an electromagnet 31 and laterally maintained by a part 32 that features a V-shaped groove. Stop 28 limits the movement of mobile table 14 to the right. Vertical shaft 20 is then displaced in height, and its upper end comes to fit under platform 2, in order to lift it. Then, stop 28 is retracted and platform 2 is disengaged from support 6 to the right. Shaft 20 is then lowered, in order for table 14 to be able to pass underneath cleaning station 7 and angle-iron 15 and to move under sawing station 9. There, the height of the platform is again brought to a predetermined value, and a first series of parallel saw cuts is carried out in the X-direction.

For that purpose, frame 17 can move in alternating directions in the X direction under the sawing station and, with each cycle, the saw is displaced by one step (pitch) in the perpendicular direction Y. At the end of this series, the turret is driven to rotate 90° around its axis, and a second series of parallel cuts is carried out. During the sawing operation, the operator carries out the alignment of a new wafer on a second platform at alignment station 1. At the end of the sawing, table 14 conveys the platform it bears to the cleaning station, where it deposits the platform on fixed support 6 in the position represented by dotted lines, and then moves to pick up the second platform at the alignment station 1, after which its operating cycle starts again.

When the cleaning of a wafer is finished, the wafer is unloaded from its supporting platform. Angle-iron 15 is then displaced, e.g., manually by the operator who holds it by handle 30, in the direction of alignment station 1. The evolving profile of rails 26 is designed so that angle-iron 15 moves to laterally engage the platform at the cleaning station 7, to lift it, and to convey it in its position from the other side of support 6, where the platform is ready to receive a new wafer. Angle-iron 15 is then returned to the left in its initial position. A safety device may be provided, in order to prevent table 14 from depositing a platform at cleaning station 7, whenever angle-iron 15 has not returned to that initial position.

Thus, it can be easily seen that, in accordance with the invention, the precise alignment of the wafers is carried out by a fixed positioning device, while mobile table 14 guarantees maintenance of the precise orientation of the platform during its transfer, its adjustment in height, and its 90° rotation. The displacement of angle-iron 15 in itself is not subject to requirements of extreme precision.

Figure 2:
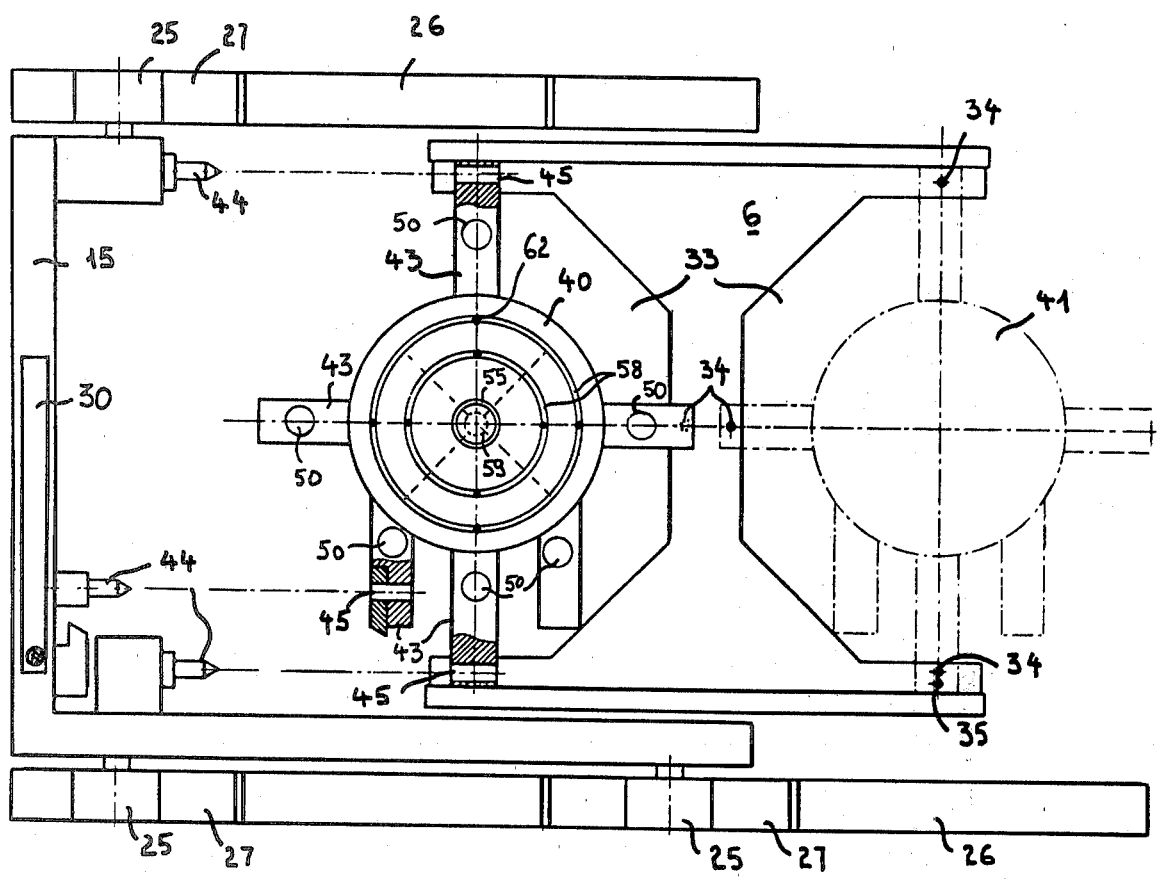
FIG. 2 is a top view of the fixed support of the alignment and cleaning stations, as well as of the second type of transfer means, of the installation in FIG. 1.

FIG. 2 represents the fixed support 6 featuring two openings 33 for the supporting platforms underneath cleaning station 7 (platform 40) or alignment station 1 (platform 41, in dotted lines). Each platform encompasses radial tongues 43 through which it rests on the contours of support 6; where it is maintained by suction via vacuum ducts 34 that lead out to the upper surface of said support at the spots where tongues 43 come to rest. Furthermore, as can be seen in FIG. 4, one of the tongues of each platform includes a duct 56 to connect an annular groove of the surface of the platform with the ending 35 of a corresponding duct in support 6. This is done in order to maintain a semiconductor wafer on the platform by means of the suction created by a first suction source, whenever the platform is in place on support 6. Whenever the wafer is previously glued to the surface of a flexible sheet 38 (FIG. 4), magnetic tablets 50 provided on said tongues 43 allow the maintenance of a metal hoop 39, which ensures the traction of the flexible sheet. These tablets 50 have no function if the wafer is previously glued on a plate of rigid material.

Also shown in FIG. 2 is the second type of transfer means 15 formed by an angle-iron guided by rollers 25 on rails 26. Angle-iron 15 encompasses three connecting nipples 44, which come to engage laterally with three corresponding bores 45 of the three tongues 43 of the supporting platforms. Angle-iron 15 may be easily removed from rails 26 and utilized by the operator to transport a platform independently of the installation for whatever operation is desired. In that case, a locking element 46 makes it possible to connect temporarily the platform with the angle-iron.

Figure 3:
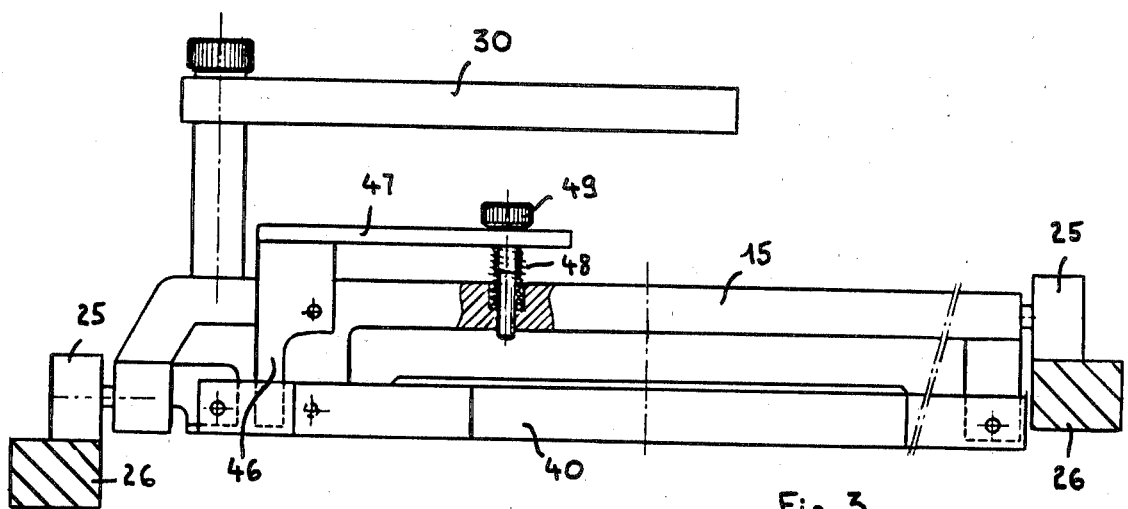
FIG. 3 is a side view of the elements shown in FIG. 2.

FIG. 3 is a lateral view of the combination represented in FIG. 2, and there is shown angle-iron 15, rollers 25, rails 26, platform 40 and handle 30. Furthermore, a lever 47 held back by a compression spring 48 makes it possible to disengage locking element 46 and to release platform 40. Lever 47 may be secured by safety screw 49.

Figure 4:
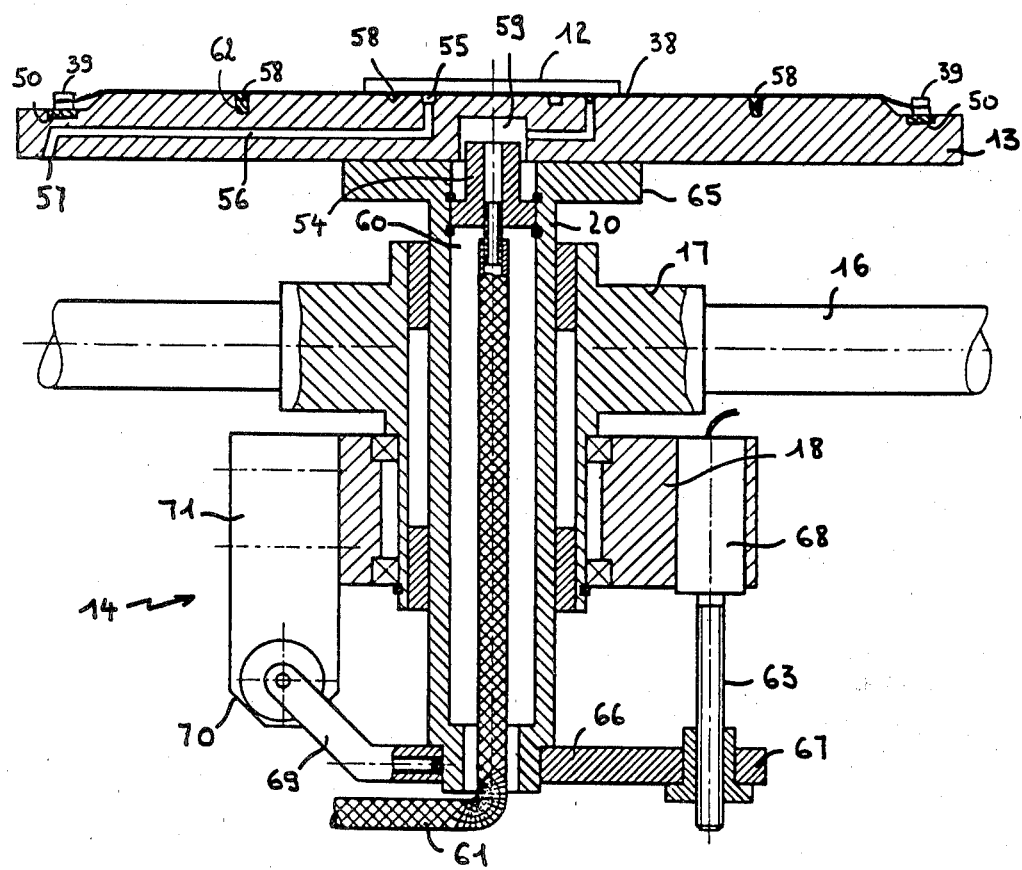
FIG. 4 is a schematic sectional view of the first type of transfer means, of FIG. 1.

FIG. 4 shows a section of mobile table 14 of the handling device of the invention supporting a platform 13 which received a semiconductor wafer 12. Platform 13 features on its upper surface an annular groove 55 capable of being connected to a first source of suction by means of duct 56 which ends in 57 at the end of a radial tongue 43 opposite a corresponding duct of the support, when the platform is in place on support 6 at the alignment or cleaning stations. Platform 13 furthermore features a series of concentric grooves 58 connected to a central bore 59, which comes to fit whenever the platform is located on table 14 on a suction nozzle 54 located at the upper end of a central bore 60 of the latter. Platform 13 is also connected to a second source of suction, by flexible tube 61. In this fashion, it can be seen that wafer 12 is kept on platform 13 by suction by said platform positioned on fixed support 6 or on mobile table 14. Naturally, a single source of suction could be used to supply the entire installation. The concentric grooves 58 are subdivided into several portions, capable of being isolated by screws 62, so as to permit the platform to accommodate pieces of varying shapes and dimensions.

Mobile table 14 encompasses a frame 17 mounted in sliding fashion on at least one shaft 16 by means of air bearings and driven by a motor, e.g., via a chain. A turret 18 is mounted in rotary fashion on frame 17 in a manner such as to be able to undergo a 90° rotation around its vertical axis. The mechanism that controls this rotation shall be described in greater detail in connection with FIG. 5. Turret 18 accommodates, in a sliding fashion, a vertical shaft 20 of which upper end 65 accommodates platform 13. The lower end of shaft 20 is integral with a transversal lever 66 of which one arm 67 is actuated vertically by a motor 68 fastened to turret 18 by means of threaded rod 63. The other arm 69 carries two air stops 70 directed one against the other, in whose interval there penetrates a guiding plate 71, which is also integral with turret 18. Thus, it is prevented that the height adjustment of shaft 20 causes a change in the angular orientation of platform 13.

Figure 5:
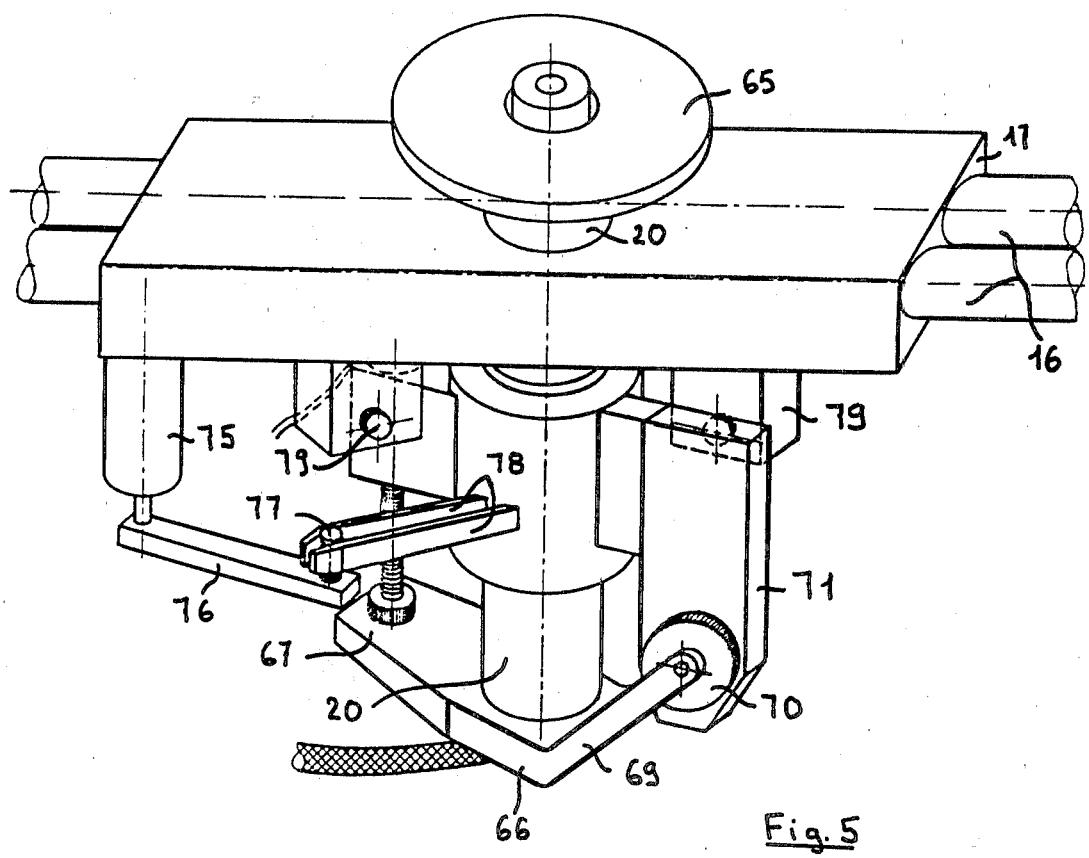
FIG. 5 is a schematic perspective view of the first type of transfer means, of FIG. 4.

As can be more clearly seen in FIG. 5, turret 18 is rotated by 90° by a Maltese Cross mechanism. The drive is effected by a motor 75 integral with frame 17 operating a crosspiece 76 carrying out a 90° rotation in one direction or the other. The opposite end of crosspiece 16 carries a roller 77, which rolls in a space defined by two arms 76 jutting out radially from the turret. Preferably, these arms form spring-action blades narrowing at their free end, whose force maintains the roller in an end-of-stroke position. The precision of the angular orientation of the turret in one or the other of its extreme positions shifted by 90° one from the other is ensured by stops 79 integral with frame 17 against which stops guiding plate 71 alternately rests.

Although it has been described in connection with a specific mode of embodiment, the present invention is capable of numerous modifications and variants, which will be obvious to those skilled in the art.

Thus, the invention is not limited to the sawing of semiconductor materials and other installations may incorporate the handling device of the invention. This device is of particular interest whenever the matter concerns an operation which requires very precise positioning of the piece to be treated and in which it is desired to carry out such positioning separately from the station where said operation is carried out.

It will be equally understood that the device is particularly suitable to automatic control by a microprocessor, including even automatic actuation of the second type of transfer means.

What is claimed is:

1. An installation for the sawing of plate materials, so as to form a plurality of elementary platelets, comprising:

an alignment station where the plates are provided with a predetermined orientation;

a sawing station where the plates are sawed into a plurality of elementary platelets;

a cleaning station where the sawed plates are subjected to the action of a cleaning agent; and a handling device to convey each plate to successive stations of the installation, said handling device comprising:

at least two independent platforms for receiving the plate and maintaining it in an orientation that is predetermined in relation to said platform;

a first transfer means for successively conveying each platform equipped with a plate at the alignment station to the sawing station, while maintaining the plate's precise orientation;

said first transfer means supporting and orientating said plate properly during the cutting operation and then conveying and depositing said plate at the cleaning station; and a second transfer means taking each platform at the cleaning station and conveying said each platform to the alignment station to deposit it there;

said handling device comprising means such that sawing of one plate may be carried out during the cleaning of a preceding plate or during alignment of a subsequent plate.

2. An installation according to claim 1, wherein said alignment, sawing and cleaning stations are aligned with the cleaning station located between the two other stations.

3. An installation according to claim 1, wherein the first transfer means is displaced axially parallel to the axis of the stations and vertically thereto.

4. An installation according to claim 3, wherein the first transfer means comprises means to precisely rotate the platforms by 90° around a vertical axis.

5. An installation according to claims 2, 1, 3 or 4, wherein the second transfer means is displaced axially parallel to the axis of the stations.

6. An installation according to claims 2, 1, 3 or 4, wherein the first transfer means passes underneath the second transfer means in their axial displacement when said first and second transfer means convey a supporting platform from the alignment station to the sawing station and when, having deposited a platform at the cleaning station, said first and second transfer means return to pick up another platform at the alignment station.

7. An installation according to claim 1, wherein said handling device comprises at least two independent supporting platforms capable of being positioned selectively in a fixed support that is integral with one of said alignment, sawing or cleaning stations, a first transfer means for moving said supporting platforms, each of said platforms receiving and maintaining one part in a predetermined orientation, said platforms being positionable in said fixed support and on the first transfer means.

8. An installation according to claim 7, wherein each supporting platform comprises an upper surface for receiving said part and an annular groove connected to a first suction means when the platform is positioned in the fixed support, said annular groove being located on said upper surface, said platform further comprising a series of concentric grooves being supplied by a second suction means connected to the first transfer means when the platform is positioned on the first transfer means.

9. An installation according to claim 8, wherein said concentric grooves comprise portions capable of being blocked from providing suction to accommodate variable shapes and dimensions of the parts on the platform.

10. An installation according to claims 8 or 9, wherein the supporting platform comprises a plurality of radial tongues, said radial tongues positioning said platform in the fixed support, a duct in one of said radial tongues, one end of said duct connecting with the annular groove and the other end of said duct connecting opposite a corresponding duct of the support, said corresponding duct being connected to the first suction means.

11. An installation according to claims 8 or 9, wherein the concentric grooves connect with a central bore of the supporting platform, said central bore being located in the extension of a corresponding bore of said transfer means when the platform is positioned on the first transfer means, said central bore being connected to the second suction means.

12. An installation according to claim 9, wherein the radial tongues of the supporting platform comprise magnetic tablets to ensure that a flexible sheet placed on the platform is held there.

13. An installation according to claims 7, 8, 9 or 12, wherein the first transfer means comprises a frame that is mounted in sliding fashion on at least one shaft by means of air bearings.

14. An installation according to claim 13, wherein the first transfer means comprises a turret comprising means to rotate said turret relative to the frame 90° around a vertical axis.

15. An installation according to claim 14, wherein the turret is connected to the frame by means of a "Maltese Cross" system.

16. An installation according to claim 15, comprising spring blades to maintain the turret in an end-of-travel position.

17. An installation according to claims 14, 15 or 16, wherein the turret accommodates a shaft that is adjustable in height, said shaft having an upper end accommodating the supporting platform, the shaft being guided by air bearings.

18. An installation according to claim 17, further comprising a vertical guide plate being integral with the turret, the shaft being maintained in angular position during its height displacement by two air stops directed against respective sides of said vertical guide plate.

19. An installation according to claims 7 or 8, comprising a second transfer means, the supporting being capable of being positioned in said second transfer means.

20. An installation according to claim 19, wherein said supporting platforms comprise at least three radial tongues and said second transfer means engages laterally with at least three radial tongues.

21. An installation according to claim 20, wherein the second transfer means comprises a support in the shape of an angle iron guided by rollers on two parallel rails.

22. An installation according to claim 21, wherein the angle iron comprises three connecting nipples that cooperatively connect with bores of at least three radial tongues of the supporting platforms.

23. An installation according to claims 21 or 22, wherein the rails form an evolving profile.

24. An installation according to claim 19, wherein the second transfer means comprises a locking element to lock the supporting platform in place.

25. An installation according to claim 23, wherein the second transfer means is manually displaceable on said rails.

26. An installation according to claim 13, further comprising a retractable stop to ensure the precise positioning of the first transfer means at a given point of its sliding path whenever the stop is in place, said retractable stop enabling the transfer means to be displaced beyond that point when the stop is retracted to ensure the disengagement of the supporting platform from its fixed support.

27. An installation according to claim 26, wherein the stop comprises a rod of high-hardness material actuated by an electromagnet and maintained laterally by a part with a V-shaped groove.

28. An installation according to claim 26, wherein the shaft of the first transfer means is connected at its lower end to a transversal lever of which one arm is actuated by a motor and of which an other arm of said lever carries said air stops, said shaft being adjustable in height.

* * * * *